United States Patent
Chappas et al.

(10) Patent No.: US 8,410,006 B2
(45) Date of Patent: *Apr. 2, 2013

(54) COMPOSITE FILTER MEDIA WITH HIGH SURFACE AREA FIBERS

(76) Inventors: Walter Chappas, Raleigh, NC (US); Behnam Pourdeyhimi, Cary, NC (US)

( * ) Notice: Subject to any disclaimer, the term of this patent is extended or adjusted under 35 U.S.C. 154(b) by 561 days.

This patent is subject to a terminal disclaimer.

(21) Appl. No.: 11/811,845

(22) Filed: Jun. 12, 2007

(65) Prior Publication Data

US 2008/0105612 A1    May 8, 2008

Related U.S. Application Data

(63) Continuation-in-part of application No. 11/592,370, filed on Nov. 3, 2006, now Pat. No. 8,129,019.

(51) Int. Cl.
| | |
|---|---|
| D04H 1/00 | (2006.01) |
| D04H 3/00 | (2012.01) |
| D04H 5/00 | (2012.01) |
| D04H 13/00 | (2006.01) |

(52) U.S. Cl. ........ 442/337; 442/334; 442/335; 442/340; 442/351; 442/381; 442/389; 442/400; 428/364; 428/365; 428/373; 428/374; 428/397; 428/401

(58) Field of Classification Search .................. 442/334, 442/335, 337, 340, 351, 381, 389, 400; 428/364, 428/365, 373, 374, 397, 401

See application file for complete search history.

(56) References Cited

U.S. PATENT DOCUMENTS

| 4,950,531 A * | 8/1990 | Radwanski et al. .......... 442/351 |
| 5,611,981 A | 3/1997 | Phillips et al. |
| 5,855,798 A | 1/1999 | Phillips et al. |
| 5,972,505 A | 10/1999 | Phillips et al. |
| 6,344,595 B1 | 2/2002 | Phillips et al. |
| 6,753,082 B1 | 6/2004 | Lobovsky et al. |
| 6,761,957 B1 | 7/2004 | Phillips et al. |
| 6,811,874 B2 * | 11/2004 | Tanaka et al. ................. 428/370 |
| 6,855,420 B2 | 2/2005 | Johnson et al. |

FOREIGN PATENT DOCUMENTS

| JP | 05239709 | * | 9/1993 |
| JP | 05239709 A | * | 9/1993 |

* cited by examiner

*Primary Examiner* — Andrew Piziali
(74) *Attorney, Agent, or Firm* — Spilman Thomas & Battle, PLLC (57) ABSTRACT

The present invention is directed to a high surface area fibers and an improved filter composite media made from the same. More specifically, the composite media preferably comprises a winged-fiber layer having high surface area fibers for increased absorption and strength and a meltblown layer for additional filtration. In one preferred embodiment the high surface area fibers have a middle region with a plurality of projections that define a plurality of channels, which increases the surface area of the fiber. In one preferred embodiment, the high surface area fiber has a specific surface area of about 140,000 cm$^2$/g or higher and a denier of about 1.0 to about 2.0. The high surface area fiber of the present invention is made using a bicomponent extrusion process using a thermoplastic polymer and a dissolvable sheath.

25 Claims, 8 Drawing Sheets

COMPOSITE FILTER MEDIA WITH HIGH SURFACE AREA FIBERS

CROSS-REFERENCE TO RELATED APPLICATIONS

This application is a continuation-in-part of U.S. patent application Ser. No. 11/592,370, filed Nov. 3, 2006, now U.S. Pat. No. 8,129,019, which is expressly incorporated herein by reference.

FIELD OF THE INVENTION

The present invention relates generally to composites that exhibit increased durability, absorbency and other desirable properties. More specifically, the present invention is directed to a composite media comprising a winged-fiber layer having high surface area properties for increased absorption.

DESCRIPTION OF THE PRIOR ART

Meltblown composites are well known in the art for use with filtration technologies and applications. Melt blowing is a process for producing fibrous webs or layers directly from polymers or resins using high-velocity air or other appropriate forces to attenuate the filaments. Meltblown fibers are most commonly constructed from polypropylene, which is readily formed from the meltblown process and easily charges electrostatically to form a charged media. Meltblowing produces microfibers generally having diameters in the range of 2 μm to 5 μm in diameter, although such microfibers may be as small as 0.5 μm in diameter by modifying processing parameters such as the meltblown machine's polymer throughput and by using a higher meltflow polymer. The ability to produce meltblown fibers with extremely small diameters is particularly useful for finer filtration applications. Although meltblown fibers have proven effective for filtering, they have several drawbacks. Most meltblown fibers are weak and tear easily, requiring the need to stack and layer numerous meltblown fiber layers or use the meltblown fiber layers in combination with a support or scrim to maximize their strength and filtration properties. The result is heavier and more expensive meltblown composites.

An alternative to meltblown fibers are glass microfibers, which are also well known in the art for their use in filtration applications. Glass microfibers rely on their fine diameters to increase filtration properties. Furthermore, glass microfibers are shorter in length and are a known skin irritant, which causes problems and restrictions during processing into nonwovens.

Another alternative to meltblown fibers are electrospun fibers. Electrospun fibers are also well known in the art for their use in filtration applications. Electrospun fibers are often in the range of 0.1 to 1.0 microns and rely on their fine diameters to increase filtration properties. Electrospinning is a very slow process and therefore, only small amounts can be used realistically. Since these fibers are also quite fragile and weak, they are often used in combination with other layers of nonwovens that provide strength and pleatability.

Traditional composites are made by extruding thermoplastic resins and forming webs or layers that are made into a variety of non-woven composite media or laminates such as spunbound-meltblown-spunbound (SMS) composites or spunbound-meltblown-pleated composites. In such configurations the meltblown layer serves as the core filtering element, and the spunbound layers strengthen the overall composition. However, despite these composites, there exists a need for an improved composite media that has a high-efficiency fiber layer that does not require an additional support, and can function as a stand-alone filter. Additionally, there is a need to combine a high-efficiency fiber layer with a meltblown layer or another non-winged-fiber layer. Further, there is a need for an improved composite media with increased durability, strength, absorption and filtration capabilities formed with a novel winged-fiber layer having high surface area properties.

Fibers capable of absorbing and filtering liquids or particles are known in the art. Fiber surfaces are often treated chemically or physically to enhance their ability to hold liquids or particles. For instance, in order to increase the surface area of a fiber the surfaces are made rough to create grooves and channels. Some absorbent fibers known in the art are treated with hydrophobic or hydrophilic chemicals, which affect fluid flow.

Figure 1:
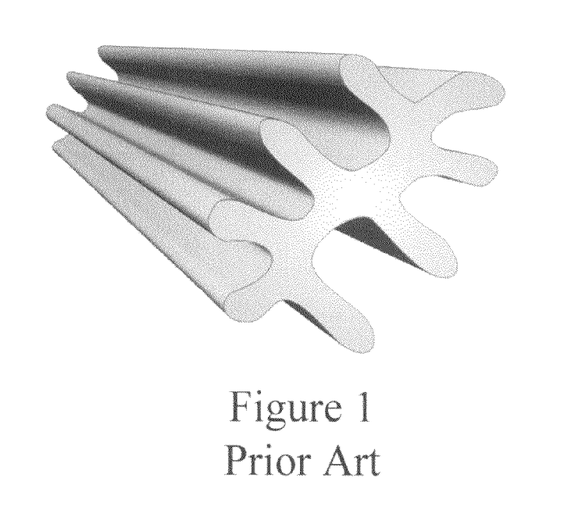
FIG. 1 is a cross-sectional perspective view of a prior art fiber.

One such fiber that is used for absorption is the 4 DG fiber developed originally by Eastman Chemical Company and commercially available from Fiber Innovation Technologies. Referring to the drawing of FIG. 1 is a cross-sectional view of the 4 DG fiber, also known as surface capillary fibers. The prior art fiber of FIG. 1 discloses one set of at least three arms that project from one side of the spine to define a first set of grooves, and a second set of at least three arms that project from a second side of the spine to define a second set of grooves. The arms and grooves of the prior art fiber have an irregular geometry so as to create grooves that are deep and narrow enough to transport fluids along the length of the fiber by capillary action. Additionally, the prior art fiber of FIG. 1 has a large denier which limits its use in certain applications for which nano-fibers are required.

The 4 DG fiber seeks to increase the depth of the grooves by providing a fiber with a specific cross-sectional geometry. However, there are several disadvantages to the 4 DG fiber and other fibers having a similar configuration. Many such fibers cannot be spun to fiber diameters less than about 50 to 60 microns, thereby restricting their potential applications. The minimum denier attainable with the 4 DG fiber is approximately 3. Furthermore, due to the large grooves between the arms of the fiber, the arms often break during the spinning process. Such fibers have a limited number of arms and grooves resulting in a relatively low surface to volume ratio, which restricts the amount of fluid that can be absorbed. Finally, due to the size and geometry of the 4 DG fiber, the arms can easily interlock during fabric formation resulting in dense and compressed materials, which diminishes its filtration and absorption properties.

There have been many attempts in the past to create special fibers with deep grooves or channels on the surface to promote surface capillary properties. Such fibers utilize multiple legs, typically 8, to form deep channels on the surface. The surface of these fibers can be treated with appropriate treatments that accommodate and facilitate fluid flow more readily and are therefore useful for fluid movement. Many of these fibers have a higher degree of bulk density and are therefore suitable for insulation applications. Since the arms can capture and trap particles, they are further useful for filtration applications or for surface treatments to activate the surface.

Fibers with surface grooves are produced using special spinnerets as single component fibers. The fibers are extruded and melted, delivering the molten polymer through spin beams and the spinneret capillaries to form the desired shape. The fibers are then quenched upon the exit from the spinneret and drawn subsequently to form a stronger and finer fiber. However, because of the deep grooves or arms of the fibers, the fibers cannot be made into normal fiber sizes that are preferred and used by the industry. Most fibers used today in the industry are between 1 and 3 denier per filament, however most fibers with the increased surface areas as discussed above are currently available in 6 denier or larger. Fibers with deniers of 6 or larger are extremely coarse, more difficult to process, and are limited in their use.

Traditional single component round fibers are commonly used in the art. The cross-sectional design of a single component round fiber is typically a circle. One problem with single component round fibers is that in order to increase the surface area of the fiber, the cross-sectional area also increases, resulting in the fiber with a large denier.

There is a need for a fiber with an increased surface area, at least 2 to 3 times the surface area of typical fibers known in the art, and with deep grooves or channels on the surface to promote surface capillary properties while maintaining a normal fiber size as used in the industry. The present invention discloses a fiber with an increased surface area and multiple surface channels, while maintaining a small denier size and use of such fiber in an improved composite media.

The present invention is provided to solve the problems discussed above and other problems, and to provide advantages and aspects not provided by prior fibers and composites of this type. A full discussion of the features and advantages of the present invention is deferred to the following detailed description, which proceeds with reference to the accompanying drawings.

SUMMARY OF THE INVENTION

A first aspect of the present invention is to provide an improved composite media. The composite media has a first fiber layer with a first side and a second side. The composite media has a winged-fiber layer bonded to the first side of the first fiber layer. The winged-fiber layer has a web of high surface area fibers. The high surface area fibers have an internal fiber with a cross-section having a middle region. The middle region has a plurality of projections extending from the middle region and along the periphery of the middle region. The plurality of projections define a plurality of channels. In one embodiment, a dissolvable external sheath encompasses the high surface area fiber. In one embodiment, the fiber layer comprises meltblown fibers or electrospun fibers.

In another embodiment, the composite has a third layer bonded to the second side of the first fiber layer. The third layer being a winged-fiber layer, a scrim layer, a glass microfiber layer, an electrospun web or other layers of meltblown media.

The winged-fiber layer comprises a web of high surface area fibers. The high surface area fibers have an internal fiber with a cross-section having a middle region. The middle region has a plurality of projections extending from the middle region and along the periphery of the middle region. The plurality of projections define a plurality of channels. The fiber also has an external sheath that is dissolvable. The external sheath encompasses the internal fiber.

A second aspect of the present invention is to provide an improved composite media. The composite media has a first meltblown or electrospun fiber layer having a first side and a second side. The composite media has a winged-fiber layer that is bonded to the first side of the first meltblown or electrospun fiber layer. The winged-fiber layer has a web of high surface area fibers. The high surface area fibers have an internal fiber, in which the internal fiber is a thermoplastic polymer. The internal fiber has a cross-section with a longitudinal axis having a plurality of projections extending from the longitudinal axis. Along the periphery of the longitudinal axis, the plurality of projections define a plurality of channels. The channels have a width of about 200 nanometers to about 1000 nanometers. The internal fiber has a cross-sectional length of about 1 micrometer to about 100 micrometers, and a cross-sectional width of about 1 micrometer to about 100 micrometers. The cross-section of the internal fiber has a surface area of about 100,000 $cm^2/g$ to about 1,000,000 $cm^2/g$.

The present invention is further directed to a method for making an improved composite media, in which the steps comprise providing a first fiber layer having a first side and a second side. Providing a winged-fiber layer having a web of high surface area fibers formed by co-extruding an internal fiber and an external sheath. The internal fiber is a thermoplastic polymer, and the external sheath is a dissolvable polymer. The internal fiber has a cross-section with a middle region. The middle region has a plurality of projections extending from the middle region and along a periphery of the middle region. The plurality of projections define a plurality of channels. The internal fiber and the external sheath are melt spun to form a bicomponent fiber. The external sheath is removed with a solvent to yield a high surface area fiber, or winged-fiber. The winged-fibers are formed into a web or layer. The winged-fiber layer is bonded to the first side of the first fiber layer to form the composite media.

In another aspect of the present invention, a textile product is provided. The textile product has a composite media. The composite media comprises a first fiber layer with a first side and a second side. The composite media has a winged-fiber layer bonded to the first side of the fiber layer. The winged-fiber layer comprises a web of high surface area fibers.

Thus, the present invention provides a composite media made from a winged-fiber layer and a meltblown or an electrospun fiber layer with increased durability and absorbency.

These and other aspects of the present invention will become apparent to those skilled in the art after a reading of the following description of the preferred embodiment when considered with the drawings, as they support the claimed invention.

DETAILED DESCRIPTION

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms. Referring now to the drawings in general, the illustrations are for the purpose of describing a preferred embodiment of the invention and are not intended to limit the invention thereto.

Figure 9:
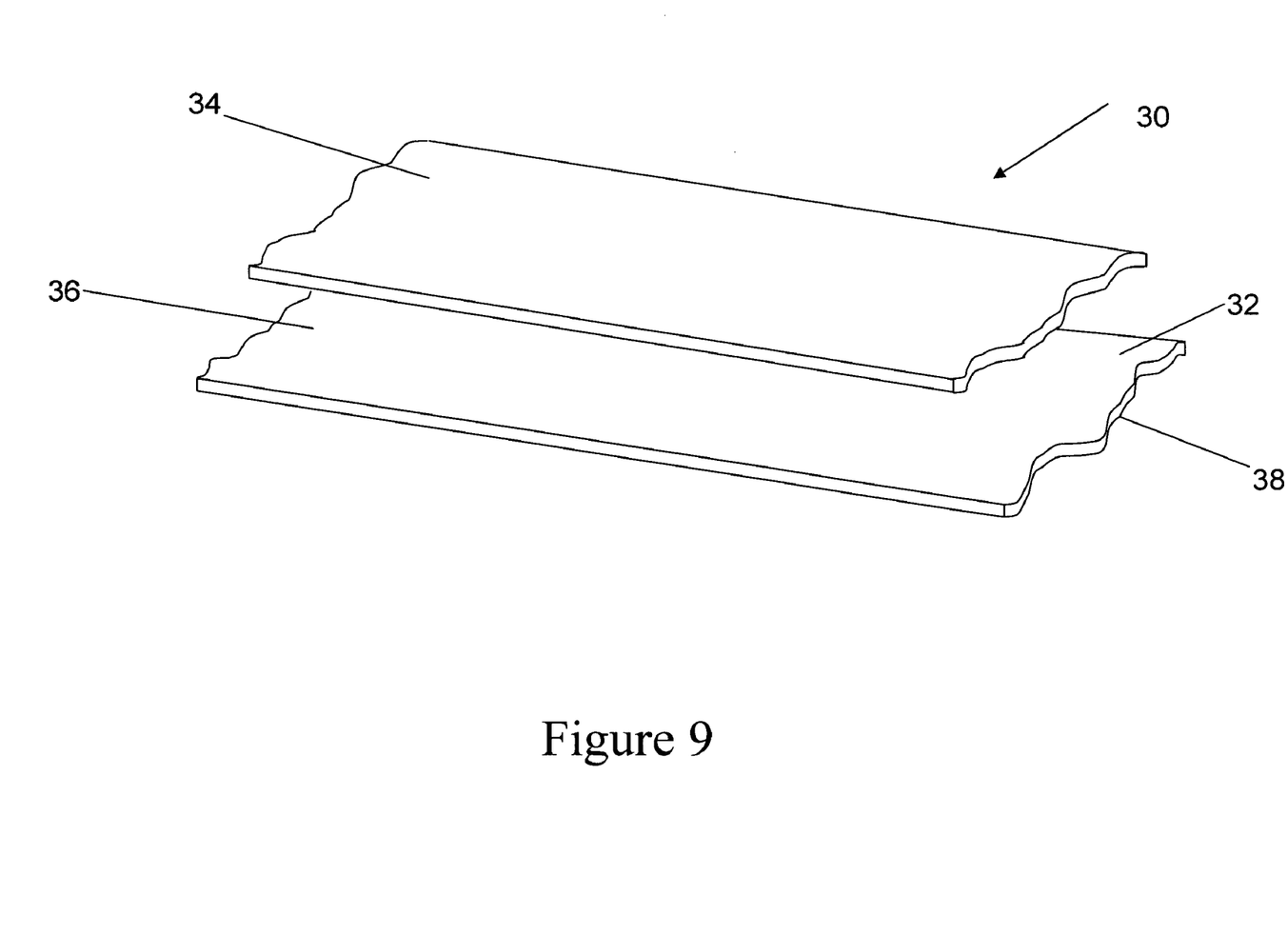
FIG. 9 is a perspective view of a composite media according to one embodiment of the present invention.

Referring to the drawings, FIG. 9 shows a perspective view of a composite media of the present invention generally designated by reference numeral 30. As shown in FIG. 9, the composite 30 generally comprises a fiber layer 32 and a winged-fiber layer 34. The first fiber layer 32 has a first side 36 and a second side 38. In a preferred embodiment of the present invention, the fiber layer 32 is a meltblown fiber layer. The meltblown layer comprises meltblown fibers formed by extruding a molten thermoplastic polymer through a plurality of throughputs to form filaments. One method of reducing the diameter of the meltblown fibers is by attenuating the filaments using a high velocity gas stream. Depending on the desired application, the meltblown fibers are preferably formed from polymers and are more preferably formed from polyolefines, polyesters, polyamides or thermoplastic elastomers including, but not limited to, thermoplastic polyurethane elastomers (TPUs) such as polyethers, polyether esters, and PBAX and elastomeric olefins. In one embodiment elastomers and more specifically, TPUs, are preferred to provide stretchability and recovery properties, as well as enhanced strength to the composite media.

One advantage of using meltblown TPU fibers is that the fibers have "sticky" or "tacky" properties that help the meltblown fiber layer function as a prefilter to capture particles before airflow reaches a subsequent layer of the composite media. The stickiness or tackiness also helps in the overall process of making the multi-layered filter by reducing or eliminating the need for a lamination step, described below.

In another embodiment of the present invention, the first layer 32 may comprise other fibers such as, but not limited to, electrospun fibers, glass microfibers, 4 DG fibers (described above), or other nonwoven materials. For instance, the first layer 32 may also be a nonwoven made from staple fibers such as, but not limited to, cellulose, wool, polypropylene, polyethylene, or other microfibers. Further, the nonwoven may be made from a wetlaid process. If the fibers are not inherently sticky or tacky as in TPUs, they can be treated with a tacky spray or adhesive such as, but not limited to, acrylics with low glass transition temperatures, latex, polyurethane compounds, or other self cross-linking materials with low glass transition temperatures.

Figure 2:
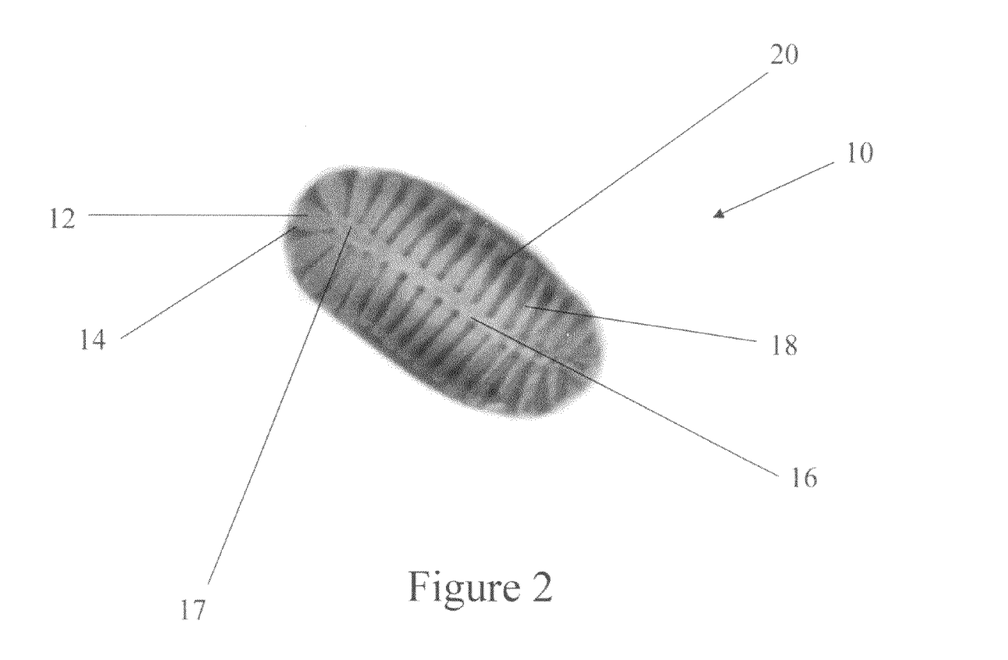
FIG. 2 is a cross-sectional view of a fiber with an external sheath, in accordance with one embodiment of the present invention.
Figure 3:
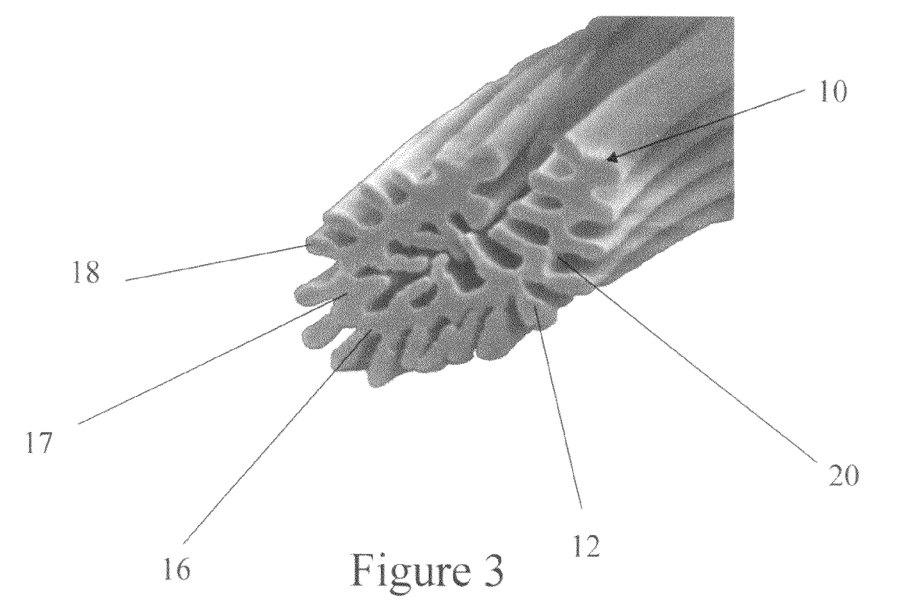
FIG. 3 is a cross-sectional view of a single fiber, in accordance with one embodiment of the present invention.
Figure 4:
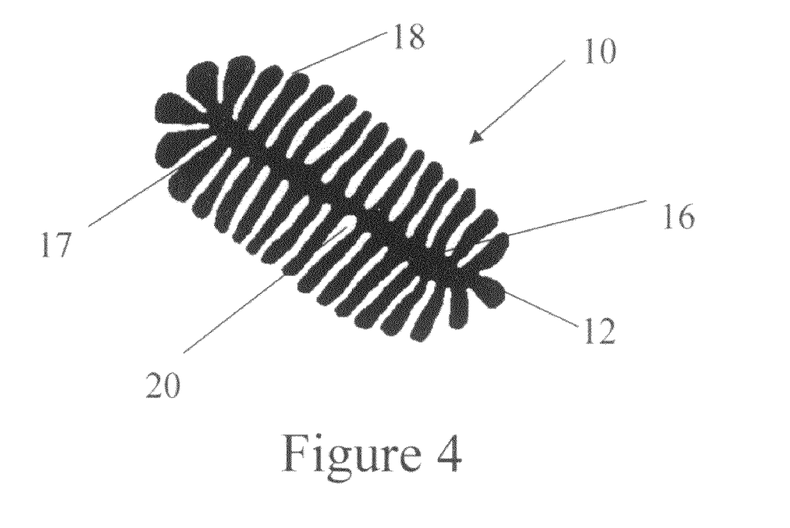
FIG. 4 is a cross-sectional view of a fiber without the external sheath, in accordance with one embodiment of the present invention.

Referring again to FIG. 9, the winged-fiber layer 34 of the composite media 30 comprises a plurality of high surface area fibers. FIGS. 2-4 disclose a cross-section of the high surface area fibers of the present invention generally designated by the reference numeral 10. As shown in FIG. 2, the fiber 10 generally comprises an internal fiber 12 and an external sheath 14. The fiber 10 is generally constructed from two different polymer compositions that can be extruded in an oval cross-section, which allows for high processability. Alternatively, the cross-section can be circular or other shapes as desired. The extrusion process and the method of making the fiber 10 of the present invention are described in greater detail below.

As further shown in FIGS. 2-4, the cross-section of the internal fiber 12 has a generally winged-shape, or amoeba-like shape. The internal fiber 12 has a middle region 16, which is the longitudinal axis 17 that runs down the center of the internal fiber 12. The longitudinal axis 17 has a plurality of projections 18 that extend from the longitudinal axis 17, which are depicted in FIGS. 2-4. In the preferred embodiment, the plurality of projections extend along the periphery of the longitudinal axis 17. Alternative cross-sectional shapes, such as but not limited to a circular-shape or the like, would have the middle region 16 formed as a hub where the projections extend from the hub. The plurality of projections 18 increase the surface areas and surface capillaries for a single fiber. In the preferred embodiment, the plurality of projections 18 define a plurality of channels 20, as shown in FIG. 4. In one embodiment, the plurality of channels 20 are uniformly spaced. The channels 20 create a surface capillary portion along the length of the fiber 10 that facilitates the absorption of liquids within the fiber 10. Additionally, the channels 20 allow particles, such as debris and dirt, to be picked-up and retained within the fiber 10. Thus, the fiber of the present invention has a plurality of longitudinal capillary channels 21 that extend along the length of the fiber as shown in FIG. 3. The present invention also drastically increases the surface area of the cross-section of the internal fiber 12 due to the plurality of projections 18. The increased surface area created by the internal fiber 12 depends on the number of segments that are used during the manufacturing of the fiber 10, which is discussed in detail below.

Preferably, the channels 20 are nano-sized, having a width of about 200 nanometers. Alternatively, the channels 20 could be between 200 nanometers to 1000 nanometers. The width of the channels 20 can be modified to fit different applications. The nano-sized channels of the present invention allow the fiber 10 to be used in applications where micro-filtration or micro-absorption is necessary. For example, certain filtration mechanisms require a channel size of about 300 nanometers. Because the channel size for each fiber can be regulated, the present invention can be used to create a composite media 30 having fibers with different channel sizes. For example, a composite media such as a filter could comprise fiber bundles having 200 nanometer channels and 500 nanometer channels. In one embodiment if the channels have a width of about 200 nanometers there are about 32 projections 18 extending from the middle section 16. Additionally, the channels may be treated chemically to further enhance their filtration and absorption properties.

In the preferred embodiment of the present invention, the internal fiber 12 is a thermoplastic polymer known in the art. Any number of thermoplastic polymers can be used, such as but not limited to, polypropylene, polyester, nylon, polyethylene, thermoplastic urethanes (TPU), copolyesters, or liquid crystalline polymers.

Figure 5:
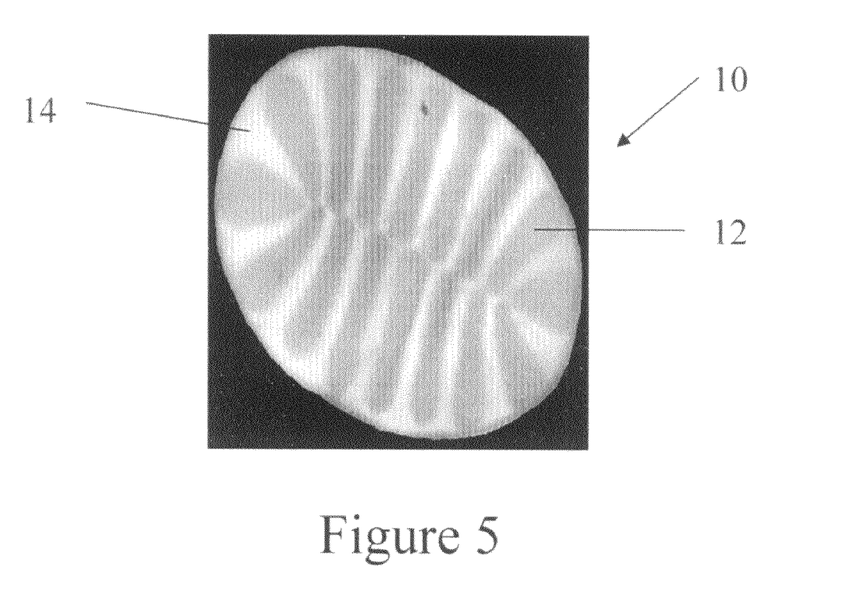
FIG. 5 is a cross-sectional view of the fiber having a circular configuration, in accordance with one embodiment of the present invention.

In the preferred embodiment the cross-section of the fiber is highly flexible and has a solid interior. Alternatively, in one embodiment, the interior, or middle region part of the internal fiber is a void. The void in the center forms an added channel for fluid flow. FIG. 5, shows a cross-section of a fiber of the present invention missing the middle region 16 of the internal fiber 12. The external sheath 14 assists in the formation of the winged-fiber shape as discussed in greater detail below.

Alternatively, in another embodiment, the middle region 16 of the internal fiber 12 can be formed into a circular configuration during the extrusion process. This void allows the internal fiber 12 to be more rigid and have more bending resistance because of the void in the center. Additionally, the void in the center forms an added channel for fluid flow. A fiber with a circular cross section with a void will have a lower tendency to bend over itself.

FIG. 2 shows a cross-sectional view of the fiber 10 with the external sheath 14. In the preferred embodiment the external sheath 14 is a dissolvable thermoplastic, such as but not limited to, polyactide (PLA), co-polyester (PETG), polyvinyl alcohol (PVA), or ethylene-vinyl alcohol copolymer (EVOH). It is contemplated that any number of dissolvable thermoplastics known in the art may be used as the external sheath 14 in connection with the present invention. In the preferred embodiment the external sheath 14 encompasses the internal fiber 12 as shown in FIG. 2.

One aspect of the present invention is increasing the surface area of the fiber, while maintaining the denier of the fiber between 1 and 3. In the preferred embodiment, the denier of the fiber is about 1.0 to about 2.0. However, alternatively, the denier of the fiber can range from about 1.0 to about 20.0.

Figure 8:
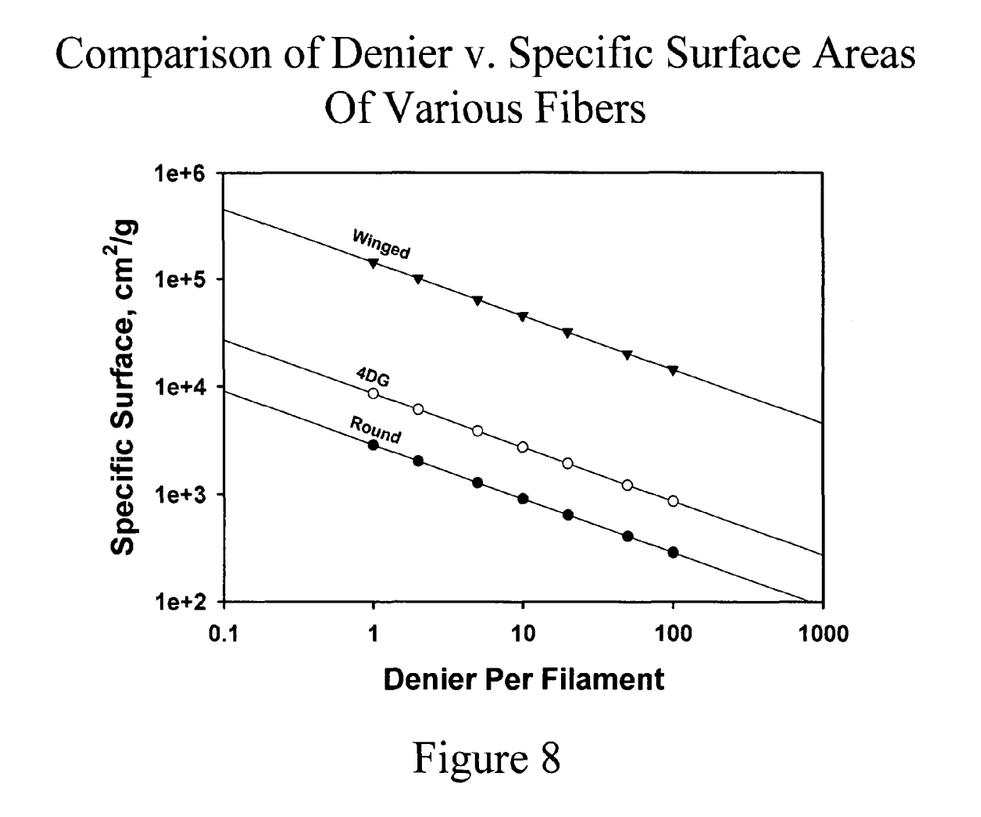
FIG. 8 is a graph comparing the denier per filament versus the specific surface areas for a round fiber, a 4 DG fiber, and a fiber of the present invention.

Denier is the unit used to measure the fineness of yarns, and is equal to the mass in grams of 9,000 meters of yarn. In the preferred embodiment of the present invention, the specific surface area for a one (1) denier fiber is about 28,000 and about 200,000 cm²/g. The specific surface area in terms of cm²/g of a fiber is measured by the following equation:

$$\text{Specific Surface Area} = \alpha \sqrt{\left(\frac{4\pi L}{\rho \times \text{Denier}}\right)}$$

Where $$\alpha = \text{Shape Factor} = \frac{P^2}{4\pi A}$$

where $L = \text{Length}, \ldots 9 \times 10^5 \text{ cm}$ $\rho = \text{Density}, \ldots 1.38 \frac{g}{cm^3}$ $\text{Denier} = \text{Linear Density}$ $P = \text{Perimeter}$ $A = \text{Cross Sectional Area}$ The specific surface area of the preferred embodiment of the present invention is about 57-60 times greater than a typical 4 DG fiber known in the art. As shown in FIG. 8, the specific surface area of a fiber of the present invention is significantly greater than a traditional round fiber or a typical 4 DG fiber having the same denier. For example, a round fiber with a denier of 3 has a specific surface area of 1653 cm²/g. A 4 DG fiber with a denier of 3 has a specific surface area of 4900 cm²/g. In contrast, a fiber of the present invention with a denier of 3 has a specific surface area of over about 80,000 cm²/g. In one embodiment of the present invention, the cross-section of the internal fiber has a specific surface area of about 140,000 cm²/g or higher. The present invention achieves a large specific surface area because of the unique geometry of the plurality of projections and the plurality of channels. While the preferred embodiment of the present invention has a fiber denier of about 1.0 to about 2.0, the above comparison was chosen because the 4 DG fiber is not capable of being produced with a denier below 3.

In the preferred embodiment, the internal fiber 12 has a cross-sectional length of about 20 micrometers and a cross-sectional width of about 10 micrometers, which yields a fiber having a denier of about 1.5. Denier refers to the linear density of the fiber and is the weight in grams for a fiber measuring 9,000 meters. In another embodiment, the internal fiber 12 has a cross-sectional length of about 10 micrometers and the width of about 10 micrometers. The internal fiber 12 of the present invention may have a cross-sectional length of about 1 micrometer to about 100 micrometers and a cross-sectional length of about 1 micrometer to about 100 micrometers. Alternatively, in another embodiment of the present invention the fiber could have a denier of 3 or more, which would provide a larger fiber with significantly large surface areas.

The method of making the fiber of the present invention uses extrusion techniques known in the art. Typically, bicomponent fibers are formed by coextruding or, extruding two polymers from the same spinneret with both polymers contained in the same filament or fiber. The extrusion process forces thick, viscous polymers through a spinneret to form semi-solid fibers. In the preferred embodiment of the present invention, the extrusion system will form the fibers as described by directing and channeling the two polymers appropriately, resulting in a more uniform shape. The number of holes on the plates correspond to the number of segments present in the fiber. These filaments are then solidified. The preferred embodiment of the present invention uses melt spinning to form the fibers, however other methods known in the art can be used. For example, a segmented pie extrusion system can be used to form fibers with projections extending from the longitudinal axis by a careful selection of the two polymers and control of the extrusion process.

The method of making the preferred embodiment begins by extruding a bicomponent fiber comprising a thermoplastic polymer, the internal fiber 12, and a dissolvable thermoplastic polymer, the external sheath 14. The bicomponent fiber is extruded through a spinneret having any number of desired holes and cross-sectional shapes. In the preferred embodiment the cross-section of the spinneret is oval for high processability, alternatively a round cross-section can also be used, or other desired shapes.

Alternatively, the final cross-sectional shape of the fiber, the winged-shape as discussed above, is determined by the number of segments formed from the extrusion process. The segments resemble pie-pieces, called a "segmented-pie" bicomponent fiber. Typical fibers of the prior art are formed from 16 segments, however in order to achieve the high surface area cross-section of the present invention, the fiber must have at least 4 segments.

In one embodiment of the present invention, the extruded bicomponent fiber has at least 4 segments. Alternatively, in another embodiment of the present invention the winged-shape cross-section of the internal fiber yields extremely high surface areas because it is formed from a bicomponent fiber having 64 segments. A caterpillar-like shape, as shown in FIGS. 2-4, was an unexpected result generated by a 64 segmented-pie extrusion. It is difficult to form a bicomponent fiber having more than 24 segments and the prior art fibers are limited in the number of segments they can have.

One way to control the shape and the size of the segments is by changing the temperature, viscosity, or pressure of the bicomponent fiber during the extrusion process. Melt spinning allows fibers to be extruded from the spinneret in different cross-sectional shapes, such as round, trilobal, pentagonal, octagonal, and other shapes. The bicomponent segments of one embodiment of the present invention resemble a segmented pie having anywhere up to 64 pie segments. In the preferred embodiment the segments alternate between the internal fiber 12 and the dissolvable external sheath 14. It is important that the segments alternate because once the external sheath 14 is washed and removed, the remaining segments define the plurality of projections that form the basis for absorption and filtration. The number of projections is directly proportional to the total surface area generated. Therefore, fibers with precise and pre-determined surfaces can be formed.

Figure 6:
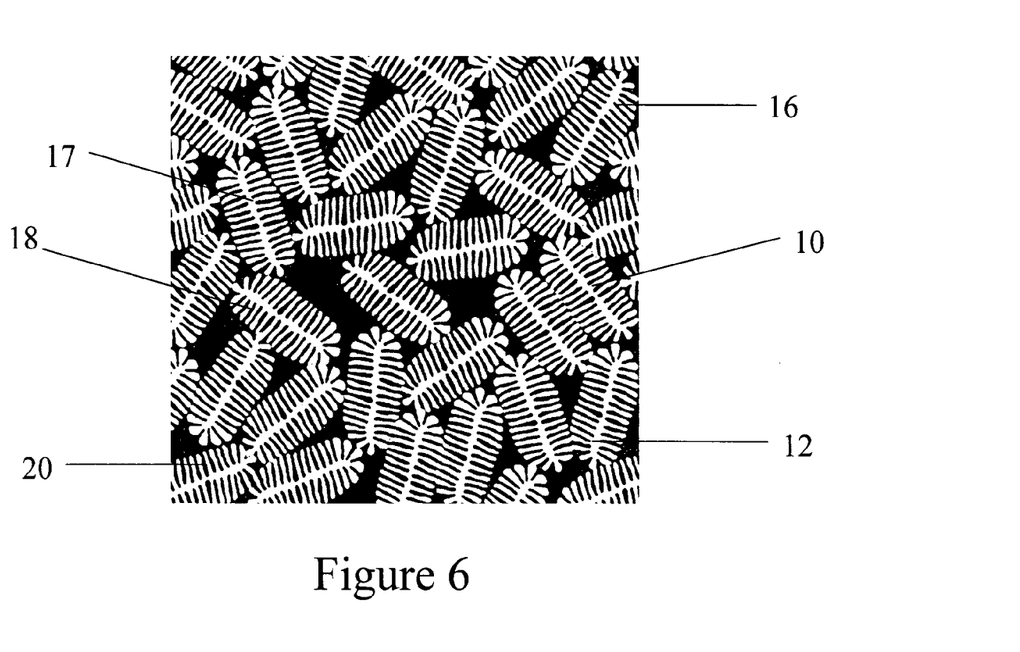
FIG. 6 is a cross-sectional view of a non-woven fabric, in accordance with one embodiment of the present invention.
Figure 7:
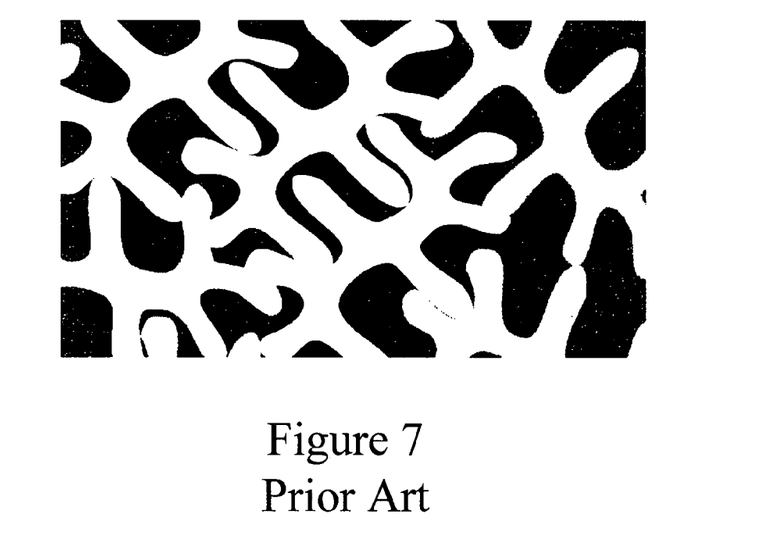
FIG. 7 is a cross-sectional view of a non-woven fabric of the prior art.

In a preferred embodiment, after the bicomponent fiber is extruded and melt spun, the bicomponent fiber can be formed into a winged-fiber web or layer. The bicomponent fiber can be bound together to form a composite media, such as a filter. Alternatively, the bicomponent fiber can be formed into a woven fabric, such as a garment. One of the advantages of the winged-fiber of the present invention is that the external sheath does not have to be removed until after the web is made. This enhances handling of the winged-fiber and reduces costs associated with manufacturing. FIG. 6 shows a non-woven fabric of the present invention and illustrates how the winged-shaped fibers assemble together to form a web 34. As shown in FIG. 6, the fibers can be compressed closely together to form bundles without interlocking when they are placed adjacent to each other due to the geometry of the fiber and the size of the channels. Additionally, because the textile fabric can be constructed when the external sheath is still on, the sheath further prevents the fibers from interlocking with one another. FIG. 7 shows a prior art fabric in which the fibers interlock. Because the winged-fibers of the present invention do not interlock like other fibers known in the prior art, the effectiveness of the channels of the present invention is not compromised and remains available for absorption or filtration. The external component can be removed after the winged-fiber layer 34 is formed. Therefore, the fibers of the present invention and their projections cannot interlock.

Once the winged-fiber layer 34 is formed, the fabric is washed with a solvent such as, but not limited to, NaOH, acids, or in the case of water dispersible polymers, water is used in order to remove the soluble external sheath. Alternatively, the bicomponent fiber can be washed prior to forming the winged-fiber layer 34 if desired.

In order to form the winged-fiber layer 34 of the present invention, the high surface area fibers 10 can be bonded using several different techniques including thermal, chemical, or mechanical bonding. In one embodiment, the winged-fiber layer 34 is formed using hydroentanglement, which is a mechanism used to entangle and bond fibers using hydrodynamic forces. Alternatively, winged-fiber layers 34 can be created by needle punching which mechanically orientates and interlocks the fibers of a spunbound or carded web. Needle punching is achieved with many barbed felting needles repeatedly passing into and out of the web. Needle punching and hydroentanglement form a dense structure so that when the external sheath is removed, the wings will release in place forming a structure with high permeability. The ultimate application of the fabric will determine which bonding technique should be utilized. For example, if the non-woven fabric is to be used for filtering large particles, it can be made using spunbound fibers that are randomly interlocked fibers, but not woven. If the non-woven fabric is needed to filter smaller particles, then it can be made from meltblown fibers, which uses high velocity air or another appropriate force to bind the fibers together. Alternatively, filaments can be extruded, and said filaments can be crimped and cut into staple fibers from which a web can be formed and then bonded by one or more of the methods described above to form a nonwoven. Same staple or filament fibers can be used to form woven, knitted or braided structures as well.

In another embodiment of the present invention, staple non-woven fabrics can be constructed by spinning the bicomponent fiber and cutting the length of the fiber into short segments and put into bales. The bales are then spread in a uniform web by a wetlaid process or carding, and are subsequently bonded by thermo-mechanical means as known in the art.

An apparatus, generally referred to as 70, for producing a composite media 30 in-line, with all three layers being assembled on one machine, is illustrated in FIG. 9. Alternatively, the layers of the composite media may be produced independently and later combined and bonded to form the composite media. In the preferred embodiment, the winged-fiber layer 34 is completely processed before forming into a composite media 30, meaning that the external sheath 14 is removed. It is preferred that the external sheath 14 is removed from the winged-fiber layer 34 prior to composite formation, so that the wash that dissolves the external sheath 14 does not to disrupt the composition and integrity of the other layers.

Figure 10:
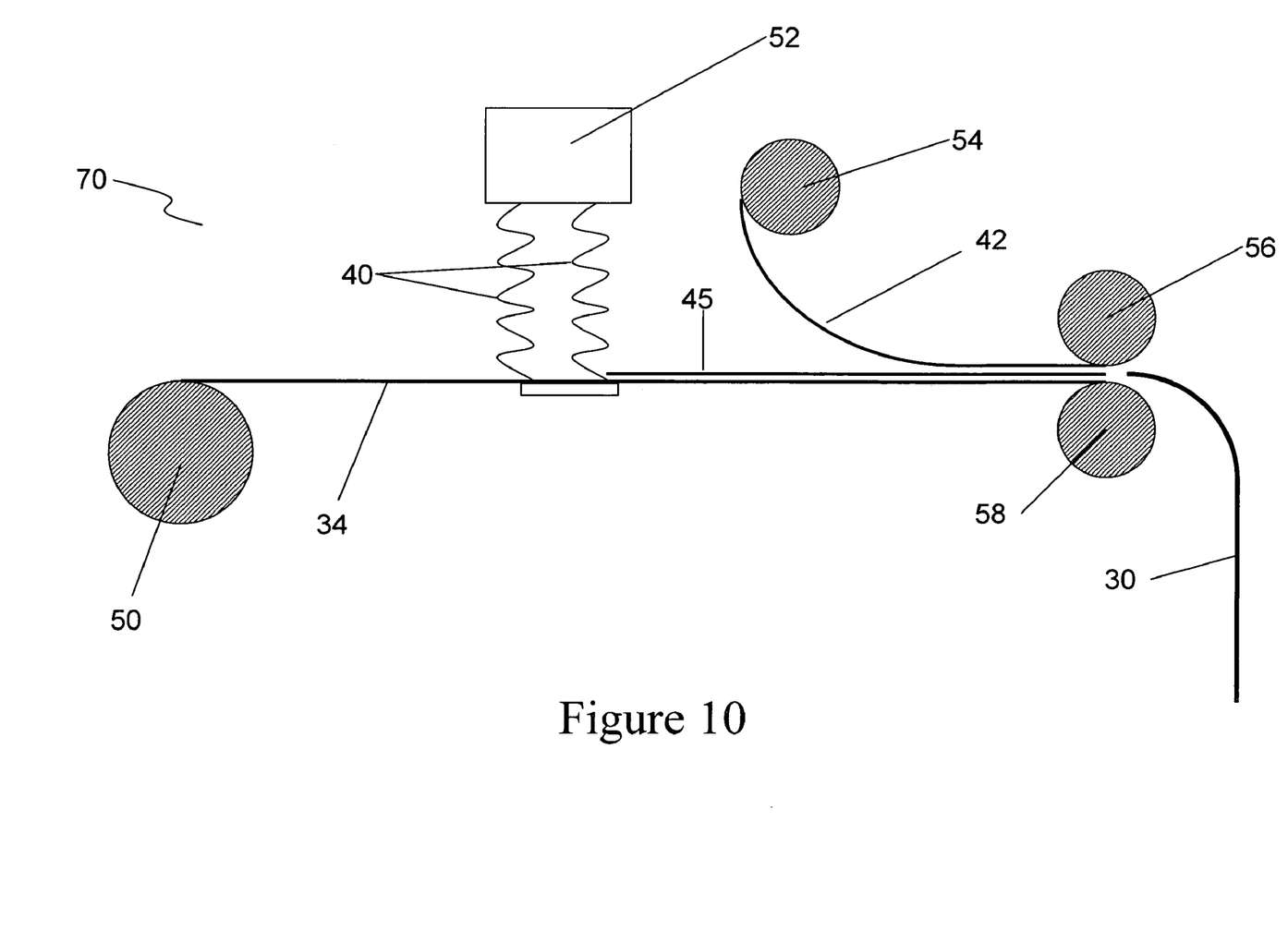
FIG. 10 is a schematic of a method of making a composite media according to one embodiment of the present invention.

The apparatus 70 shown in FIG. 10 includes a first roll 50 that holds the winged-fiber layer 34. In the preferred embodiment of FIG. 10, the winged-fiber layer 34 is feed through the apparatus where the meltblown fiber 40 is applied from the meltblown web production section 52 and deposited on the winged-fiber layer 34 to form a meltblown fiber layer 45.

If bonding is desired, the winged-fiber layer 34 is bonded to the first side 36 of the fiber layer 32 using methods known in the art such as, but not limited to, hydraulic needling, thermal calendaring, ultrasonic and/or adhesive bonding. The positioning and orientation of the layers when forming the composite media 30 is dependent on the desired resulting properties of the composite media 30. For example, in one embodiment the composite media 30 can be formed by bonding a meltblown fiber layer 45 and a winged-fiber layer 34 (MW). This orientation is optimal for filtration applications in which airflow contacts the winged-fiber layer 34 first to trap and hold more particles and debris before passing through the meltblown fiber layer 45.

Figure 11:
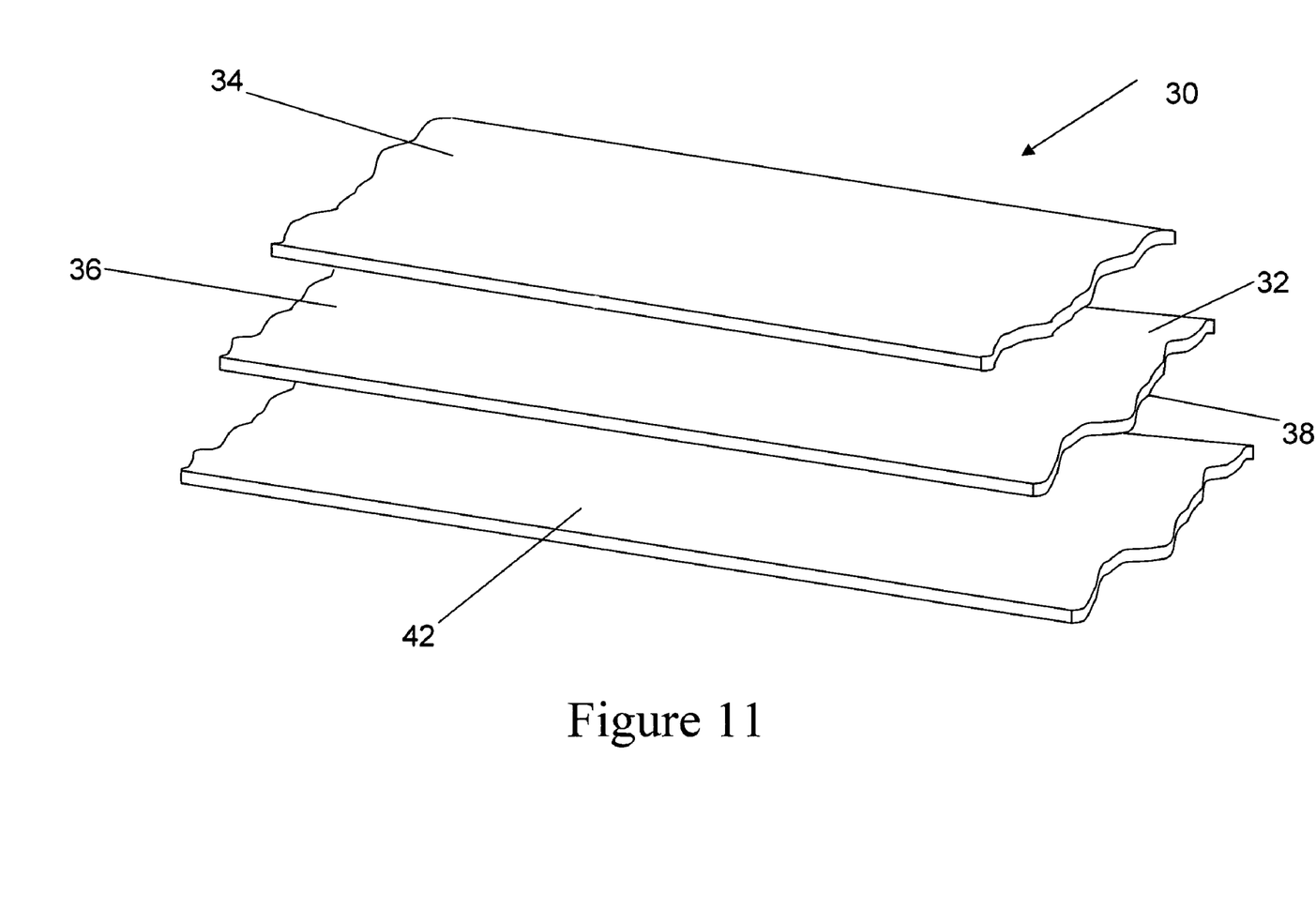
FIG. 11 is a perspective view of a composite media according to one embodiment of the present invention.

Referring now to FIG. 11, in an alternative embodiment, a second winged-fiber layer 42 can be laid to the second side 38 of the fiber layer 32, thereby creating a filter media with three layers (in order: a winged-fiber layer, a meltblown layer, and a winged-fiber layer).

FIG. 10 shows how this second winged-fiber layer 42 may be added. A second roll 54 holds the second winged-fiber layer 42 that is applied on the second side 38 of the first meltblown layer 45 (this configuration is termed "WMW" for Winged, Meltblown, Winged). The second roll 54 and second-winged fiber layer 42 are only needed as shown in FIG. 10 if a second winged-fiber layer is added to the media. If only two layers are used (e.g. one winged-fiber layer and one other fiber layer, as shown in FIG. 9 and described above), then the second roll 54 and second winged-fiber layer 42 are not necessary. In another embodiment a glass microfiber layer can be bonded to the second side 38 of the first meltblown fiber layer 45, while a winged-fiber layer 34 is bonded to the first side 36 of the meltblown fiber layer 45 (WMG). This creates a gradient depth filter that can selectively filter different sized particles. Alternatively any combination of layers can be utilized, such as but not limited to: a meltblown fiber layer, a winged-fiber layer, and then another meltblown fiber layer (MWM); a spunbond scrim layer, a meltblown layer, and a winged-fiber layer (SMW); an electrospun fiber layer and winged-fiber layer (EW); a winged-fiber layer, electrospun fiber layer, and winged-fiber layer (WEW); a spunbound scrim layer, an electrospun fiber layer, and a winged-fiber layer (SEW); a winged-fiber layer, an electrospun fiber layer, and a glass layer (WEG); or an electrospun fiber layer, winged-fiber layer, and electrospun fiber layer (EWE). Due to the strength of the winged-fiber layer, which can support pleating, it is within the scope of the present invention to pleat the meltblown fiber layer and winged-fiber layers.

Preferably, little or no bonding is required. However, if bonding is needed, as shown in FIG. 10, the winged-fiber-meltblown-winged-fiber layers are passed between thermal bonding rolls 56 and 58. In one embodiment the bonding rolls 56 and 58 are heated for thermal bonding applications, however calendar bonding, ultrasonic bonding, adhesive bonding, and hydroentangling are possible alternatives.

The layers of the composite media 30 may be bonded such that the surface area of each layer is not obstructed, but maximized to provide optimal filtration and absorption. For example, in one embodiment ultrasonic friction or quilting is desired because it is easier to implement and utilizes as little as only 1-5% or less of the surface area of the layers being bonded. In another embodiment, thermal bonding may be used, however such techniques normally use up about 8-10% of the surface area of the layers. Adhesive techniques may also be used for bonding, however adhesion techniques amount to a loss of about 1-20% of the surface area of the layers being bonded. Depending on the desired application for the composite media, several different bonding techniques are available and known in the art.

The fiber 10 of the present invention can also be used to manufacture traditional woven fabrics for use in garments and the like. Because the fibers 10 of the present invention are strong, they can be used in traditional knitting and braiding techniques without compromising the integrity of the fiber 10.

Although numerous fibers are known in the art, the present invention discloses a high surface area fiber 10 with a small denier that can be used to form composite media 30 for both woven and non-woven fabrics. The composites 30 of the present invention have higher thermal insulation capabilities than traditional composites known in the art, and form improved filtration mediums. Furthermore, the composites of the present invention are stronger, more flexible, and more breathable. As discussed above, because the winged-shaped fibers are compression resilient, the channels are not obstructed and have greater capillary/wicking abilities, as well as absorption capabilities. Additionally, these winged-fibers have the ability to capture nano-sized particles. Because the winged-fibers of the present invention are strong and have shear resistance, the winged-fibers can withstand high pressures and can be used in liquid filtrations as well as demanding aerosol filtration applications requiring high pressure. As such, the present invention provides for a high-efficiency low-pressure drop filters constructed from woven or nonwoven.

There are numerous applications of the present invention. In one example the present invention can be used in non-woven fabrics to produce filter media to filter liquids or air for cleaning rooms. In yet another example, the winged-fibers of the present invention can be used with traditional round fibers to yield multi-layer fibers that can be combined using a spinneret or combined later in the manufacturing process. Combining or sandwiching the winged-fibers of the present invention with traditional round fibers allows a single product to have multiple physical properties, and is cost effective.

The present invention can also be used for improved wipe materials. In typical applications wipes are primed with liquids before use, such as in baby wipes. However, the present invention allows the ability to create a wipe product that will pick up dirt and dust particles without leaving behind any particles because the liquid in the channels of the fibers remains there while still dissolving and aiding the clean-up process. Additionally, the present invention can be used for hygiene and acoustic materials, thermal insulation, geotextile materials, construction materials, and compressive performance materials such as seat cushions and mattresses.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the following claims.

What is claimed is:

1. A composite media comprising:
a fiber layer having a first side and a second side;
a winged-fiber layer being adjacent to the first side of the fiber layer and;
the winged-fiber layer comprising winged-fibers with a surface area between 100,000 cm$^2$/g and 1,000,000 cm$^2$/g, the winged-fibers having a cross-section comprising a middle region, the middle region having between 16 and 32 projections extending from the middle region and along a periphery of the middle region, wherein the projections define channels, the channels having a channel width of between 200 nanometers and 300 nanometers.

2. The composite media of claim 1, further comprising a dissolvable external sheath, wherein the dissolvable external sheath encompasses the winged-fiber.

3. The composite media of claim 2, wherein the dissolvable external sheath of the winged-fiber comprises a polyactide (PLA), a co-polyester, a polyvinyl alcohol (PVA) or an ethylene-vinyl alcohol copolymer (EVOH).

4. The composite media of claim 1, further comprising a scrim layer adjacent to the second side of the fiber layer.

5. The composite media of claim 1, where in the fiber layer comprises a meltblown fiber layer.

6. The composite media of claim 5, wherein the meltblown fiber layer comprises a plurality of meltblown fibers selected from the group consisting of polyolefines, polyesters, polyamides, elastomers, thermoplastic polyurethane elastomers, polyethers, polyether esters, polyether amides (PBAX), and elastomeric olefins.

7. The composite media of claim 1, wherein the fiber layer comprises polyolefin meltblown.

8. The composite media of claim 1, wherein the fiber layer comprises a nonwoeven material.

9. The composite media of claim 8, wherein the nonwoven material comprises staple fibers.

10. The composite media of claim 9, wherein the staple fibers are selected from the group consisting of cellulose fibers, polypropylene fibers, wool fibers, acrylics, modacrylics, polyethylene fibers, and micro-fibers.

11. The composite media of claim 8, wherein the nonwoven material is made from a wetlaid process.

12. The composite media of claim 1, further comprising a chemical coating of a material on the fiber layer.

13. The composite media of claim 1, wherein the fiber layer is bonded to the winged-fiber layer.

14. The composite media of claim 13, wherein the bond between the fiber layer and the winged-fiber layer is created via a method selected from the group comprising ultrasonic bonding, thermal bonding, chemical bonding, adhesive bonding, needle punching, and hydroentangling.

15. The composite media of claim 1, wherein the winged-fiber is a thermoplastic polymer.

16. The composite media of claim 1, wherein the plurality of channels of the winged-fiber are uniformly spaced.

17. The composite media of claim 1, wherein the plurality of projections of the winged-fiber define a winged-shaped configuration.

18. The composite media of claim 1, wherein the winged-fiber has a cross-sectional length of 1 micrometer to 100 micrometers.

19. The composite media of claim 1, wherein the winged-fiber has a cross-sectional width of 1 micrometer to 100 micrometers.

20. The composite media of claim 1, wherein the winged-fiber has a denier of 1.0 to 20.0.

21. The composite media of claim 1, wherein the winged-fiber has a specific surface area of at least 140,000 cm$^2$/g.

22. The composite media of claim 1, wherein the middle region of the winded-fiber has a longitudinal axis.

23. A composite media comprising:
   a first fiber layer having a first side and a second side;
   a winged-fiber layer adjacent to the first side of the first fiber layer, and;
   the winged-fiber layer comprising a web of winged-fibers, the fibers comprising a thermoplastic polymer having a cross-section comprising a longitudinal axis having a plurality of projections extending from the longitudinal axis and along a periphery of the longitudinal axis, wherein the number of projections is between 16 and 32, and wherein the plurality of projections define a plurality of channels, the plurality of channels having a width of 200 nanometers to 300 nanometers;
   wherein the winged-fibers each have a cross-sectional length of 1 micrometers to 100 micrometers and a cross-sectional width of 1 micrometers to 100 micrometers; and
   wherein the winged-fiber has a surface area of 100,000 cm$^2$/g to 1,000,000 cm$^2$/g.

24. A textile product comprising:
   a composite media, wherein the composite media comprises a meltblown layer having a first side and a second side, a winged-fiber layer adjacent to the first side of the meltblown fiber layer, wherein the winged-fiber layer comprises a web of winged-fibers with a surface area between 100,000 cm$^2$/g and 1,000,000 cm$^2$/g, at least 16 but less than or equal to 32 projections, and wherein the projections define channels, having a width of between 200 nanometers and 300 nanometers.

25. The textile product of claim 24, wherein the composite media is a non-woven filter.

* * * * *